M. LUGER.
POWER CULTIVATOR.
APPLICATION FILED NOV. 16, 1920.

1,387,279.

Patented Aug. 9, 1921.

INVENTOR
Maximilian Luger
PER Hubert E. Peck
atty

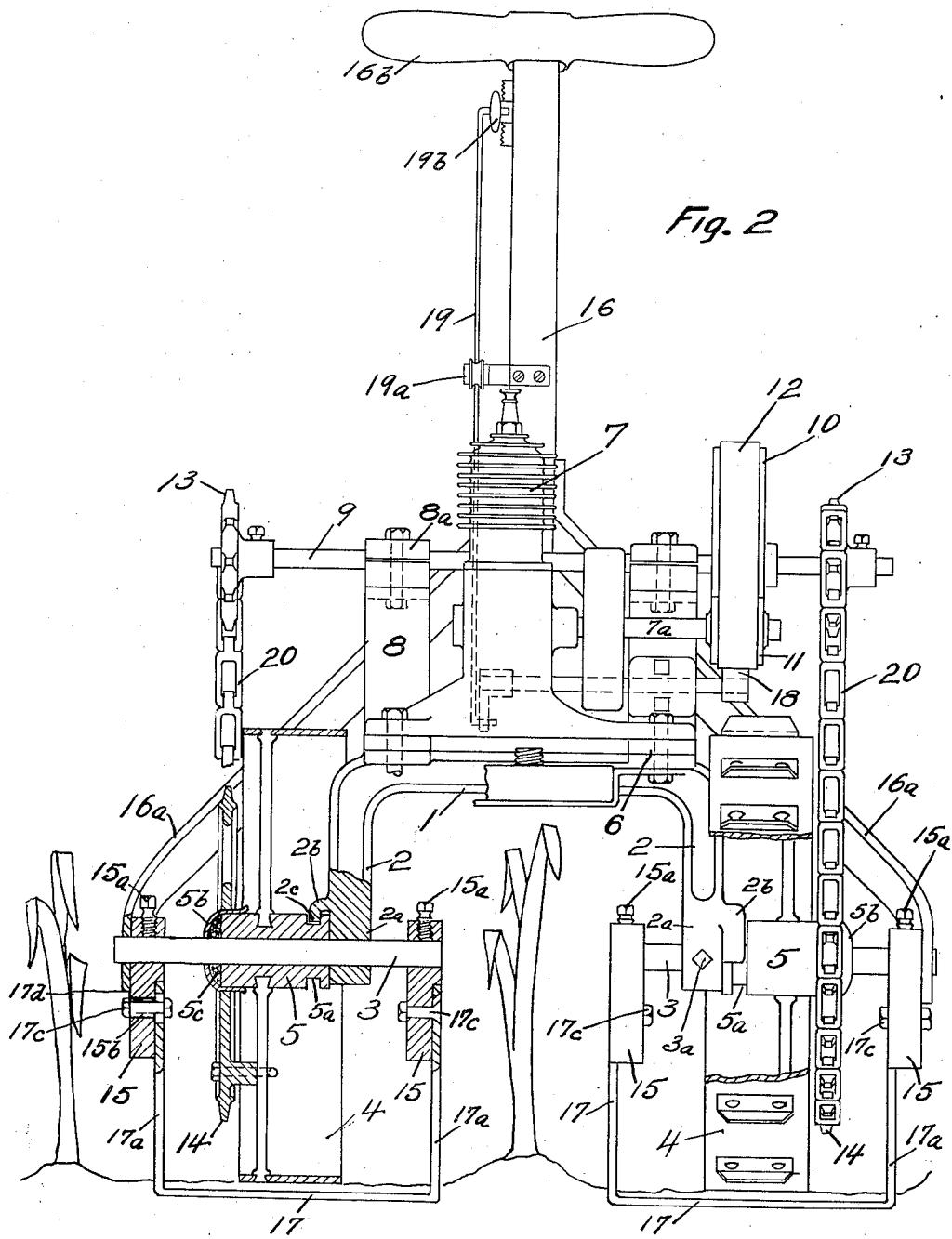

UNITED STATES PATENT OFFICE.

MAXAMILIAN LUGER, OF ROBBINSDALE, MINNESOTA.

POWER-CULTIVATOR.

1,387,279.   Specification of Letters Patent.   Patented Aug. 9, 1921.

Application filed November 16, 1920. Serial No. 424,348.

*To all whom it may concern:*

Be it known that I, MAXAMILIAN LUGER, a citizen of the United States of America, and resident of Robbinsdale, Hennepin county, State of Minnesota, have invented certain new and useful Improvements in Power-Cultivators, of which the following is a specification.

This invention relates to certain improvements in and relating to power propelled walking cultivators; and the objects and nature of the invention will be readily understood by those skilled in the art in the light of the following explanation of the accompanying drawings illustrating what I now believe to be the preferred embodiment or mechanical expression of my invention from among other forms, arrangements and constructions within the spirit and scope thereof.

The present invention provides a type of power propelled cultivator which is constructed and arranged to be manually guided and controlled by the operator who accompanies and follows the cultivator on foot, and it is an object of the invention to provide an improved straddle row cultivator of such type capable of simultaneously cultivating both sides of a row of plants with minimum danger to the plants when the cultivator is guided to the right or to the left in following the row, and also capable of being easily guided and controlled by the operator while walking behind the self propelled implement.

A further object of the invention is to provide certain improvements in self propelled walking cultivators, whereby the bull wheels or other traction elements and the cultivating tools bear certain fixed relations in operation to reduce to the minimum the lateral throw of the wheels and tools toward the plants when the cultivator is guided laterally and to render it exceedingly easy for the operator to observe the tools and guide the implement to follow the row and keep the wheels and tools from damaging the plants.

A further object of the invention is to locate the cultivating tools more or less closely adjacent to the vertical plane in which the axes of the alined bull wheels are arranged and in certain normally fixed relation to said plane and the bull wheels so that the tools and wheels move forward in parallel paths and swerve to the right or left together with the lateral throw of the tools when the implement is thus swerved or turned approximately not exceeding the lateral throw of the wheel rims.

It is a further object of the invention to provide certain improvements in power cultivators of the walking type, whereby the propelling power can be gradually applied to and released from the bull wheels or traction elements by the operator as he follows and accompanies the cultivator on foot.

It is a further object of the invention to provide a straddle row power propelled walking cultivator embodying improvements in construction and arrangements whereby the implement can be easily controlled and guided by the operator while walking behind the advancing implement.

With these and other objects in view, my invention consists in certain novel features in construction and in combinations as more fully and particularly set forth and specified hereinafter.

Referring to the accompanying drawings:

Fig. 2 is a front elevation of a power cultivator embodying my invention, some parts being shown in vertical section and other parts thereof being broken away, rows of plants being diagrammatically shown with the implement in operative relation with respect thereto.

Figure 1:
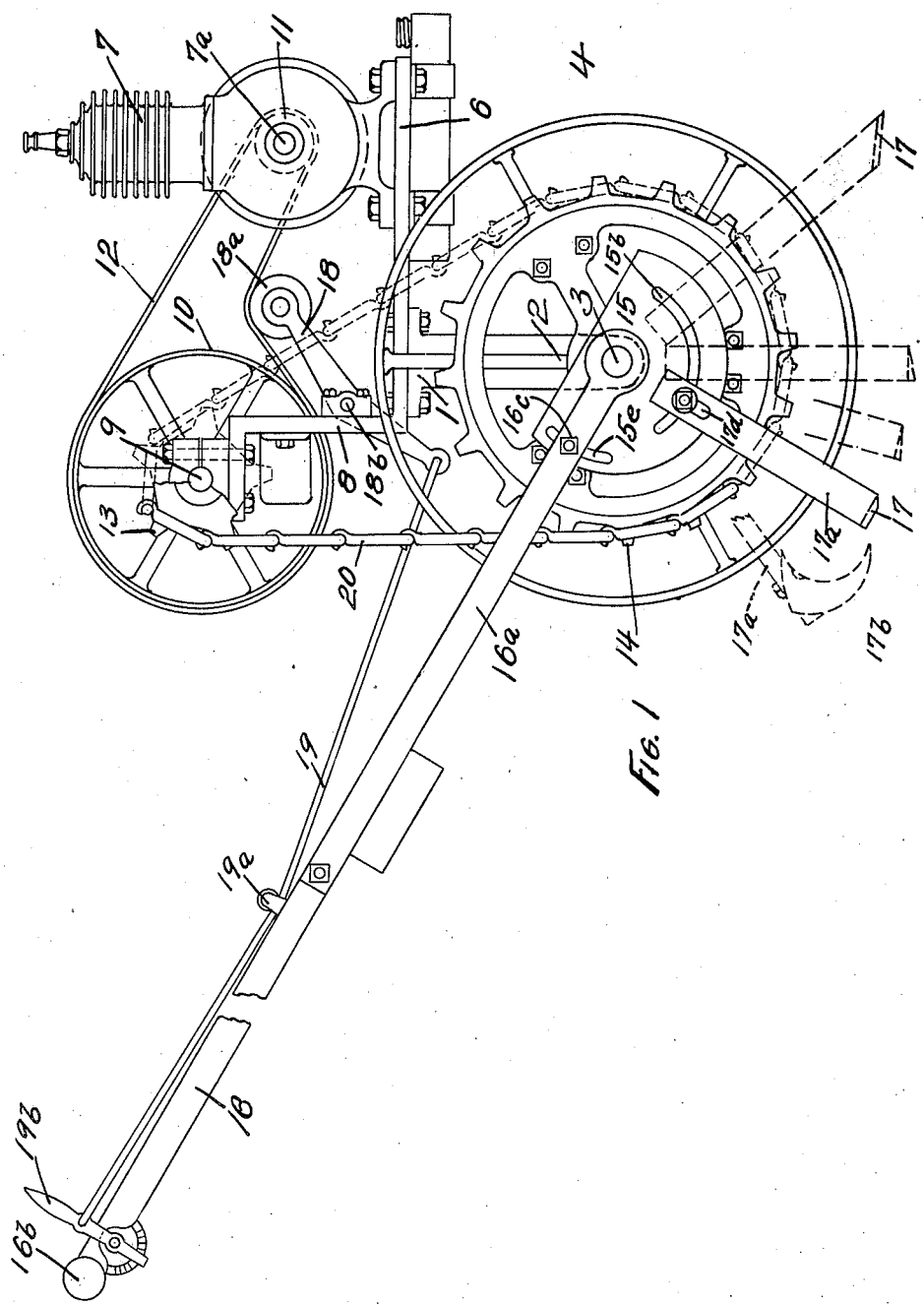
Figure 1 is a side elevation of a power cultivator embodying my invention, dotted lines showing various angular positions to which the cultivator or tilling tools can be adjusted and also illustrating tools of different types.

In the specific example illustrated, I show a straddle row cultivator or other soil tilling implement, and I herein employ the terms "cultivator" and "cultivating tools" generically and in a broad sense to include all types of soil tilling implements and tools to which my invention is applicable. This implement embodies a transverse supporting frame comprising an arched axle composed of the central elevated longitudinal portion 1, and the vertical depending ends or legs 2 which at their lower ends terminate in the hubs $2^a$.

These two hubs $2^a$ are alined and are formed with alined bores to receive the two alined straight shaft lengths or end axles 3.

These two horizontal end axles are non-rotary and are normally fixed parts of the arched axle through the medium of any suitable clamping or securing means. As convenient means for this purpose, I show the hubs $2^a$ provided with clamping or set screws 3ª. By loosening the screws, the end axles 3 are rendered capable of independent longitudinal adjustment in either direction through the hubs 2ª.

At the outer sides of the hubs 2ª any suitable cultivator supporting and traction devices are mounted on the end axles. For instance, for this purpose, I show so-called bull wheels 4 having their hubs 5 freely rotatable on the normally fixed end axles. Each hub 5 at its inner end is preferably formed with an exterior annular groove 5ª. The hubs 2ª at their outer sides are preferably formed with guard flanges or bosses 2ᵇ that overhang the inner ends of the wheel hubs, and these guard bosses are formed with tongues or ribs 2ᶜ loosely fitting the grooves 5ª to hold the wheels against undue longitudinal movement on the end axles. The outer ends of the wheel hubs are preferably provided with dust excluding caps 5ᵇ, and fibrous packing 5ᶜ.

The two horizontal alined end axles are preferably similar, and each is usually of a length to extend inwardly a suitable distance beyond the arched axle hub 2ª receiving the same, as well as outwardly a suitable distance beyond the outer end of the wheel hub thereon. These oppositely projecting ends of the end axles provide means for the attachment of cultivating tools and frame parts (such as guiding means) to the said axles which, in this instance, form a normally fixed part of the main frame.

For instance, I show the opposite projecting ends of each axle provided with vertically-arranged parallel heads or plates 15. I show these heads as similar and each in the form of a sector although I do not wish to so limit my invention. Each tool attaching head is formed with a transverse bore receiving its end axle 3 and each head is preferably longitudinally adjustable on its axle although normally rigidly secured thereto against independent movement. For instance, set or clamping screws 15ª can be employed to normally fix the heads to the axles. These heads normally depend from said axles, and any suitable cultivating tools are normally fixed thereto and depend therefrom at the inner and outer sides of the bull wheels, and spaced from said wheels according to the longitudinal adjustment of each end axle with respect to its wheel and hub 2ª, or according to the respective adjustments of the heads on the end axles.

In the embodiment shown, each cultivating tool is arranged radially with respect to the common axis of the wheels and is provided with one or more straight shanks 17ª and with a cultivating blade 17 or 17ᵇ of any desirable or suitable form according to the work to be performed thereby.

The shanks of the cultivating tools are normally fixed to the main frame of the cultivator through the medium of the tool securing heads 15 and suitable fastening devices, and said heads and fastening devices are preferably constructed and arranged to permit adjustment of said tools angularly with respect to the common axis of the wheels and also radially with respect to said axis, although I do not wish to so limit all features of my invention.

Various means can be employed for fastening the tool shanks to said heads, although in the example illustrated, I show each head formed with a segmental slot 15ᵇ arranged below and concentric with the common wheel axis, with the tool shanks fitting vertical side faces of the heads and clamped thereagainst by clamping bolts 17ᶜ. The tool shanks are preferably provided with longitudinal slots 17ᵈ to permit adjustment of the shanks radially with respect to the wheel axis. The clamping bolts also extend through the segmental slots 15ᵇ to permit angular adjustment of the shanks with respect to the wheel axis, on loosening the bolts.

In the particular embodiment illustrated, a separate tool (such as 17ª, 17ᵇ, shown by dotted lines) can be secured to each head so as to provide four separate tools, or each pair of heads can carry one tool 17, 17ª to provide the implement with two tools. This last named tool is approximately U-shaped and provides an elongated cultivating portion or blade 17 with two upwardly extending end shanks 17ª secured to the two heads on an end axle. This blade 17 extends from one side of a wheel to the other, either in advance of, below, or behind the wheel to till the ground, say between two adjacent plant rows, about as indicated by Fig. 2.

The two outside heads 15, also provide for the normally rigid or fixed attachment of the guiding handle or tongue to the main frame of the implement so that said tongue becomes in effect, a part of the implement frame.

I show the implement provided with an upwardly and rearwardly extending steering or guiding tongue 16, at its rear end having a suitable handle 16ᵇ and at its front end provided with a yoke or fork 16ª the front ends of which are rearwardly fixed to the outer end heads 15. In the particular example illustrated, the front ends of the yoke fit the outer vertical faces of the end heads and are perforated to receive the projecting outer ends of the end axles and be capable of rotary and longitudinal adjustment thereon although of course said yoke ends can be normally fixed on said axle ends. In this example, although I do not wish to so limit my invention, the yoke ends are normally fixed to said end heads by clamping bolts 16ᶜ extending through segmental slots 15ᵉ in said end heads 15. These slots are preferably concentric with the common wheel axis and are preferably of the same radius as the slots 15$^b$. By means of the clamping bolts 16$^c$ and slots 15$^c$ the handle or tongue can be adjusted vertically with respect to the heads and axle to suit various conditions.

The bars forming the yoke 16$^a$ are preferably more or less elastic or flexible to permit the hereinbefore mentioned longitudinal adjustment of the outer end heads on the end axles.

The cultivator propelling motor and the driving transmission therefrom to the bull wheels are carried by the cultivator frame and are so arranged with respect thereto that the entire frame (including the guiding tongue) is approximately balanced on the common axis of the two bull wheels. In the example illustrated, the motor 7 is arranged approximately in the fore and aft center plane of the implement, and above and centrally with respect to the space between the two bull wheels. This motor is arranged in advance of the arched axle and is rigidly secured on a bracket or rigid shelf 6 fixed on and projecting forwardly and horizontally from the center top length 1 of the arched axle. This shelf 6 is formed with bracket arms 8 extending rearwardly and upwardly from said elevated portion 1 of the arched axle. Journal boxes 8$^a$ are fixed to the upper rear ends of these arms 8 and said boxes receive and carry the jack shaft 9 parallel with the motor shaft 7$^a$, and with the common axis of the two bull wheels. This jack shaft is provided with a drive pulley 10 which is driven by the small pulley 11 on the motor shaft 7$^a$ through the medium of endless friction driving belt 12.

The bull wheels are driven from the jack shaft through the melium of endless sprocket chains 20 passing over sprocket pinions 13 normally fixed on the jack shaft ends and sprocket wheels 14 at the outer sides of the bull wheels and preferably clipped to the spokes thereof or otherwise normally fixed to said wheels so that the drive chains or other operative connections 20 are arranged outwardly beyond the wheels and their rims and between the bars of the guide tongue yoke 16$^a$.

It will be noted that the motor, jack shaft and parts carried thereby and the supporting brackets and shelf, are arranged to approximately balance each other and the guiding tongue and frame on the wheel axis, as hereinbefore pointed out so that the operator can easily guide and control the implement when at work.

I provide means for throwing the motor into and from gear or operative connection with the bull wheels, by tightening and loosening the friction drive belt 12 and thereby avoid the expense and complications incidental to the use of clutches and consequent common clutch troubles. In the example illustrated. I show a vertically swingable upwardly extending lever 18 fulcrumed between its ends to a bracket arm 8, at 18$^b$. The upper end of this lever carries a belt tightening pulley or roll 18$^a$ engaging the under surface of the bottom ply of the jack shaft drive belt 12 about midway between the jack shaft and the motor shaft. The depending arm of this belt tightener lever is coupled to the forward end of push rod or link 19 and the rear end of rod 19 is coupled to the upstanding hand lever 19$^b$, fulcrumed to the guide tongue near the handle 16$^b$ and within convenient reach of the operator while walking behind the implement and holding the handle 16$^b$ to guide the implement as it advances under the power of the motor. The rod 19 extends rearwardly along the guide tongue and suitable guides, such as 19$^a$ can be provided for the rod. The drive belt 12 is fitted to the pulleys 10, 11, to provide excessive or non-power trasmitting looseness so that it is necessary to take up the slack by belt tightener pulley 18$^a$ to cause the belt to establish driving connection between the motor and jack shaft. This result is accomplished by the operator through forward swing of the handle lever 19$^b$ which action presses the pulley 18$^a$ up to tighten the belt. The operator by thus swinging the handle lever 19$^b$ in opposite directions can easily stop and start the forward progress of the implement, and he can do this to accomplish slow or gradual starting and stopping by gradually applying and releasing the pressure of the belt tightener on the belt, to permit slip of the belt as the belt gradually takes hold. The cultivator can straddle a row and till the soil on both sides thereof, although of course, the implement can also be employed to cultivate between rows without straddling a row where the spacing between the rows permits.

I desire to employ bull wheels of the smallest possible diameter, not only to gain economy in construction but mainly to reduce to the minimum lateral throw or projection of the rims of the wheels when the implement makes a short turn to the right or left. By employing the arched axle, I am enabled to employ bull wheels of small diameter and consequently when the implement is turned or swerved to the right or left from the longitudinal plane of the rows, the foremost and rearmost portions of the rims of the wheels (the portions of the wheel rims at the horizontal diameters thereof) are allowed a maximum range of lateral throw or movement without engaging and possibly damaging the upper portions of the plants, and this notwithstanding the fact that tractor or bull wheels require comparatively wide rims usually equipped with cleats.

For the same reason, among others, I provide means and arrangements to limit the lateral throw or projection of the cultivating tools when the implement is swerved or turned sharply to the right or left, preferably so that the lateral throw of said tools will not exceed that of the extreme front and rear portions of the bull wheel rims. In other words, I want to keep the tools out of the plants of the row or rows being worked, when the cultivator following the row is swerved or turned sharply to the right or left from the line of the row. I accomplish this result by fixing the tools to move forward in planes parallel to the planes in which the wheels are advancing and by arranging the tools as close as possible to the vertical plane (transverse of the direction of forward movement) in which the common axis of the bull wheels is located. By this arrangement, I gain an additional advantage in that the operator walking behind the implement is required to watch the tools, only, and not both the tools and wheels in order to properly guide the implement to follow the row and keep the wheels and tools away from the plants. The lateral position of the tools with respect to the plants indicates the lateral position of the wheel rims with respect to the plants, as the wheels cannot move closer to the plants than do the tools, and as the lateral positions of the wheels and tools are relatively fixed, and as the tools are preferably limited to enter the ground at no greater distances from the vertical diameter of the wheel than the radius of the wheel (see various dotted lines Fig. 1).

For instance, I arrange the depending tool shanks radially with respect to the axis of the wheels, and beside the wheels and normally fixed to the frame, and these shanks are of such length with respect to the wheel diameters that the tools will preferably enter the ground in the space between two vertical planes tangential to the wheel rim at the horizontal diameter thereof, one plane intersecting the front end of said diameter and the other intersecting the rear end of said diameter.

In an implement having bull wheels of a certain diameter, I find it highly advantageous to provide the segmental slots 15$^b$ with a radius of approximately six inches, and the tool shanks of such length that the tools are limited to enter the ground within six inches of the plane in which the vertical diameters of the wheels are located, either in advance of or behind said plane. However, I do not wish to so limit all features of my invention.

I prefer to arrange the tools behind the planes of the vertical diameters of the wheels.

It is evident that various changes, modifications and variations might be resorted to without departing from the spirit and scope of my invention and hence I do not wish to limit myself to the exact disclosures hereof.

What I claim is:—

1. A straddle row self-propelled walking cultivator comprising an arched axle, bull wheels mounted thereon, a motor mounted on said axle and connected to drive said wheels, and a guiding tongue normally fixed to said axle for control by the operator walking behind the cultivator in guiding the same.

2. A power cultivator comprising an arched axle, bull wheels carrying the same, cultivating tools secured to the axle in fixed relation to and arranged beside the wheels, and a motor mounted on the axle and connected to propel said wheels.

3. A power cultivator comprising a supporting frame, supporting wheels carrying the same, a motor secured on said frame and connected to drive said wheels, manual guiding means tools carried by the frame and arranged in normal fixed relation with respect to said wheels to enter the soil approximately beside the wheels and thereby reduce to the minimum the lateral throw of the tools with respect to the wheels.

4. A power cultivator comprising a frame provided with depending arms, axles secured in and transversely of said arms, traction wheels rotatably mounted and confined on said axles, a motor carried on the frame and connected with said traction wheels to propel the same, and a steering tongue connected to said axles for manually guiding the cultivator when propelled by the said motor driven traction wheels.

5. A power cultivator comprising a supporting frame provided with opposite depending arms, axles secured in said arms and extending transversely thereof, traction wheels rotatably mounted and confined on said axles, tool holding means secured on said axles, and manual guiding means attached to said tool holding means.

6. A power cultivator comprising a supporting frame, axles mounted in said frame at opposite sides thereof, traction wheels rotatably mounted and confined on said axles, a motor carried by the frame and operatively connected to said traction wheels, and cultivator tool holding means secured to the said axles.

7. A power cultivator comprising a supporting frame, axles secured on opposite sides of said frame, traction wheels rotatably mounted and confined on said axles, cultivator tool holding means secured on said axles, cultivator tools carried by said holding means, and cultivator steering means secured to said tool holding means.

8. A power cultivator comprising a supporting frame, axles secured in opposite sides of said frame and extending transversely thereof, traction wheels rotatably mounted and secured on said axles, and cultivator tools normally fixed to the frame beside the wheels to enter the ground between the vertical plane of the vertical diameters of the traction wheels and vertical planes tangential to the extreme front and rear portions of the wheel rims, respectively.

9. A power cultivator comprising a supporting frame, axles secured in opposite sides thereof, traction wheels rotatably mounted and confined on said axles, cultivator tool holding means secured on the ends of said axles, and cultivating tools adjustably mounted on said holding means, said tools extending radially therefrom.

10. A power cultivator comprising a U-shaped supporting frame provided with the arms thereof extending downwardly, axles fixed in the lower ends of said arms transversely thereof and extending a distance inwardly and outwardly from each side thereof, traction wheels rotatably mounted and confined on the outwardly extending portions of said axles, cultivating tool holding means secured on the outer and inner ends of each of said axles, and cultivating tools secured to said tool holding means.

11. A power cultivator comprising a supporting frame, axles secured to said frame on opposite sides thereof, traction wheels mounted and confined on said axles, and cultivating tools supported from said axles, said tools being adjustable radially and angularly with respect to said axles.

12. A power cultivator comprising a supporting frame, axles secured to said frame on opposite sides thereof, traction wheels mounted and confined on said axles, and cultivating tools hung from said axles in normal fixed relation to said wheels and arranged at opposite sides of each wheel to enter the ground is proximity to the vertical plane in which the vertical diameters of said wheels are located.

13. A power cultivator comprising a wheeled supporting frame, and cultivating tools in normal fixed relation to the wheels supporting said frame and radially arranged with respect to the axis thereof.

14. A power cultivator comprising a supporting frame provided with transversely disposed alined axles secured in opposite sides thereof and extending outwardly a distance therebeyond, traction wheels rotatably mounted and confined on the outwardly extending portions of said axles, and cultivating tools hung from and in normal fixed relation to the axles, and arranged at opposite sides of each wheel.

15. A self-propelled walking cultivator comprising a supporting frame provided with depending opposite side arms, axles secured in the lower ends of said side arms, and terminating at their inner ends a distance apart and extending outwardly beyond said arms on each side of the frame, traction wheels rotatably mounted and confined on said axles, tool holding heads secured on the end portions of each of said axles, depending cultivator tools secured to said heads in fixed relation to and beside the wheels, and a steering pole connected to the axles in normal fixed relation for guiding the cultivator.

16. A power cultivator comprising an upwardly-arched supporting frame having depending opposite side arms, axles secured in said arms extending transversely thereof and a distance inwardly and outwardly therebeyond, traction wheels rotatably mounted and confined on the outwardly extending portions of said axles, said frame adapted to straddle a row of plants with said traction wheels on opposite sides of the row, cultivating tools secured in fixed relation to said wheels and said axles, manual guiding means for the cultivator, and a motor mounted on and carried by the frame and operatively connected to drive said traction wheels.

17. A power cultivator comprising a supporting frame provided with axles secured on opposite sides thereof and extending outwardly therefrom, traction wheels rotatably mounted and confined on the outwardly extending portions of said axles, and cultivating tools carried by said frame in fixed relation to said wheels and the axles and constructed and arranged to enter the ground in close proximity to the vertical plane in which the vertical diameters of said wheels are located.

18. A power cultivator comprising a supporting frame provided with axles fixed in and secured on opposite sides thereof and extending transversely of the frame, the inwardly extending ends of said axles terminating a distance apart beneath said frame, traction wheels mounted and confined on the outwardly extending portions of said axles, tool holding means fixed on the ends of said axles, respectively, and U-shaped cultivating tools attached at their ends to the tool holding means of each axle respectively.

19. A power cultivator comprising a supporting frame provided with axles secured in opposite sides extending transversely thereof and having their inwardly extending portions terminating a distance apart beneath the frame, traction wheels mounted and confined on said axles, a motor mounted on said frame and connected to drive said wheels to propel the cultivator, cultivating tools supported from said axles, and steering means connected with said axles.

20. A power cultivator comprising a supporting frame provided with axles secured in opposite sides of the frame, extending transversely thereof and terminating a distance apart therebeneath, traction wheels mounted and confined on said axles, a motor mounted on said frame and operatively connected to propel said traction wheels, cultivating tools supported from each of said axles and arranged in fixed relation thereto and beside the wheels, and a rearwardly extending guiding tongue for the operator walking behind the cultivator, said tongue being normally fixed to said frame.

21. A power cultivator comprising a main supporting frame, axles secured in opposite sides of said frame, traction wheels rotatably mounted and confined on said axles, cultivating tools supported on said frame, steering means attached to said frame, a motor mounted on and carried by said main supporting frame, a jack shaft carried by the frame and connected to drive said wheels, a driving belt connecting said motor with said shaft, a belt tightener for throwing said belt into and from driving connection between the motor and said shaft, and manually controlled operating means for said tightener extending to said steering means for actuation by the operator while steering the cultivator.

22. A self-propelled walking cultivator comprising a main frame, alined bull wheels supporting the same, a rearwardly extending guiding tongue normally fixed to said frame, a motor mounted on said frame, power transmission means from said motor to said bull wheels embodying a loose endless friction driving belt, and tightening means for said belt having manual control under the control of the operator while walking behind the cultivator and guiding the same by said tongue.

23. A self-propelled walking cultivator, comprising an arched axle, alined bull wheels carrying the same, a rearwardly extending guiding tongue normally fixed with respect to said axle, cultivating tools depending from said axle, a motor, supporting means therefor secured to the axle, and power transmission mechanism for propelling said wheels from the motor, said motor and mechanism being arranged on the axle to approximately balance the axle and the tongue on the common axis of the wheels.

24. A self-propelled walking cultivator comprising an arched axle having alined end axles independently adjustable longitudinally and normally fixed vertical heads independently adjustable longitudinally of said end axles and normally fixed thereto, cultivating tools secured to and depending from said heads, and bull wheels journaled on said end axles.

25. A self-propelled walking cultivator comprising an arched axle provided with alined supporting bull wheels and depending cultivating tools, a guiding tongue extending from said axle and normally fixed in relation thereto, forwardly and rearwardly extending supports secured to the central elevated portion of said axle, a motor and transmission mechanism carried by said supports, said transmission mechanism arranged to drive said bull wheels from said motor.

26. A power cultivator comprising a U-shaped supporting frame, traction wheels mounted on each side of said frame, cultivating tools secured to said frame within a radius of about 6 inches from a horizontal line passing through the center of said traction wheels.

27. A power cultivator comprising a U-shaped supporting frame having downwardly projecting arms, axles mounted in the ends of said arms, wheels mounted on said axles, cultivating tools secured to said power cultivator within a radius of about 6 inches of the center line of the axles.

28. A power cultivator comprising a U-shaped supporting frame having downwardly projecting arms, axles mounted in the ends of said arms, wheels mounted on said alxes, cultivating tools secured to said power cultivator within a radius of about 6 inches of the center line of the axles, said cultivating tools being so located and of such form that they will enter the ground within about 6 inches of the vertical plane passing through the center of said axles.

29. A power cultivator comprising a U-shaped supporting frame having downwardly projecting arms, axles mounted in the ends of the said arms, wheels mounted on said axles, a steering pole secured to said power cultivator within a radius of about 6 inches of center line of said axles.

30. A power cultivator comprising a supporting frame, wheels supporting said frame, cultivator or tilling tools secured to said cultivator within a radius of about 6 inches of a line passing through the center of said wheels.

31. A power cultivator comprising a frame, wheels supporting said frame, cultivating or tilling tools secured to said cultivator within a radius of about 6 inches from a line passing through the center of said wheels, said cultivating or tilling tool being so located and of such form that they must enter the ground within about 6 inches of a vertical plane passing through the center of said wheels.

32. A power cultivator comprising a frame, wheels supporting said frame and a steering pole secured to said cultivator within a radial distance of about 6 inches of a line passing through the center of said wheels.

MAXAMILIAN LUGER.